US008204305B2

(12) United States Patent
Zou et al.

(10) Patent No.: US 8,204,305 B2
(45) Date of Patent: Jun. 19, 2012

(54) DAYTIME AND NIGHTTIME IMAGE RECOGNIZING METHOD AND APPARATUS

(75) Inventors: Bo Zou, Shenyang (CN); Nan Wang, Shenyang (CN)

(73) Assignee: Alpine Electronics, Inc., Tokyo (JP)

( * ) Notice: Subject to any disclaimer, the term of this patent is extended or adjusted under 35 U.S.C. 154(b) by 1215 days.

(21) Appl. No.: 11/961,997

(22) Filed: Dec. 20, 2007

(65) Prior Publication Data

US 2008/0159623 A1 Jul. 3, 2008

(30) Foreign Application Priority Data

Dec. 29, 2006 (CN) .......................... 2006 1 0156279

(51) Int. Cl.
*G06K 9/00* (2006.01)
(52) U.S. Cl. ........ 382/170; 382/100; 382/104; 382/168; 382/171; 382/194
(58) Field of Classification Search .................. 382/100, 382/103, 104, 168–172, 194
See application file for complete search history.

(56) References Cited

U.S. PATENT DOCUMENTS

| 5,301,239 | A | * | 4/1994 | Toyama et al. | ............... | 382/104 |
| 5,809,161 | A | * | 9/1998 | Auty et al. | ................... | 382/104 |
| 7,016,045 | B2 | * | 3/2006 | Kwon | ........................... | 356/437 |
| 7,421,120 | B2 | * | 9/2008 | Kang | ............................ | 382/167 |
| 7,460,691 | B2 | * | 12/2008 | Ng et al. | ...................... | 382/107 |
| 7,653,485 | B2 | * | 1/2010 | Fujita et al. | .................. | 382/165 |
| 7,693,629 | B2 | * | 4/2010 | Kawasaki | ....................... | 701/36 |

FOREIGN PATENT DOCUMENTS

| JP | 09-35197 | | 2/1997 |
| JP | 09035197 | A * | 2/1997 |

* cited by examiner

*Primary Examiner* — Matthew Bella
*Assistant Examiner* — Eric Rush
(74) *Attorney, Agent, or Firm* — Brinks Hofer Gilson & Lione

(57) ABSTRACT

In a daytime and nighttime image recognizing method and apparatus, the method comprises predefining an air region and a terrestrial region for each image captured by a camera apparatus; inputting an image captured by the camera apparatus; calculating a lightness value histogram for the air region of the input image; and determining a lighting condition of a photo environment of the camera apparatus based on the lightness value histogram for the air region of the input image. The daytime and nighttime image recognizing method and apparatus are able to correctly recognize the lighting condition of the environment even if the air region in an image is obstructed by a background or there are no lane lines in an image. Moreover, when an erroneous recognition occurs for an individual image, the interference caused by the erroneous recognition can be precluded efficiently.

20 Claims, 8 Drawing Sheets

DAYTIME AND NIGHTTIME IMAGE RECOGNIZING METHOD AND APPARATUS

BACKGROUND

The present application claims priority to Chinese Patent Application Number 2006-10156279.8, filed Dec. 29, 2006, the entirety of which is hereby incorporated by reference.

In various applications of Intelligent Transport Systems (ITS), when a vehicle image is recognized based on machine vision, the external environment around the moving vehicle varies constantly and significantly. It is difficult to only use one particular feature or method to recognize a vehicle image under these different environments. Therefore, it is necessary to recognize a current traveling environment and to provide one of multiple different algorithms that is suitable for the current environment.

The existing vehicle image recognizing method based on a vehicle body contour and vehicle body hierarchy has a good recognizing result in the case of relatively better lighting in daytime. However, under a dark condition in nighttime, the darkness and the vehicle headlights will always destroy the above vehicle information which the vehicle image recognizing method depends on, so that it is difficult for the vehicle image recognizing method based on a vehicle body contour and vehicle body hierarchy to correctly partition and recognize a vehicle under a nighttime dark condition. Conventionally, it is required to determine whether the current image is a daytime image or a nighttime image according to the lightness of a particular portion in the image, so as to choose a vehicle image recognizing method suitable for the current environment.

The following solutions for recognizing daytime and nighttime images have been disclosed in the prior art.

The first existing daytime and nighttime image recognizing method is based on the fact that the upper part of an image is mostly characterized by an air region, and performs image recognition by calculating the average lightness value of the upper part in the image. As shown in FIG. 1, at step S1, a road condition image picked up by a camera on an object vehicle is input; at step S2, an average lightness value of the upper part (i.e., the air region) in the image input at step S1 is calculated. At step S3, the calculated average lightness value is compared with a predefined reference value, and the images whose lightness is lower than the predefined reference value are determined to be nighttime images, whereas the images whose lightness is higher than the predefined reference value are determined to be daytime images. Finally, at step S4, the result determined at step S3, i.e., the daytime and nighttime image recognizing result, is provided as an output.

However, the situations shown in FIGS. 2 to 5 will interfere with the daytime and nighttime image recognizing method that is based on the average lightness value of the upper part in the image. If an algorithm that is not suitable for the current environment is used due to an incorrect determination caused by these situations, the vehicle image is unable to be recognized or the vehicle image is incorrectly recognized.

The second daytime and nighttime image recognizing method, disclosed by Japanese Patent Laid-Open Publication No 9-35197, considers the problem that the above situations will interfere with the average lightness value of the air region in the image and thus make an incorrect determination. The second method is shown in FIG. 6. At step S21, a road condition image picked up by a camera on an object vehicle is entered. At step 22, the lane lines of the lane in which the object vehicle is traveling are detected in the image. At step S23, an intersection point of the detected lane lines is taken as a vanishing point of the image, and the region above the vanishing point is divided into 16 small regions. At step S24, the average lightness value of each small region is calculated respectively. At step S25, the average lightness value of each small region is compared with a predefined reference value, and all of the small regions whose average lightness values are lower than the predefined reference value are judged to be night regions. When more than ¾ of the small regions are judged to be nighttime regions, it is determined that the image is in a nighttime lighting condition; otherwise, the image is judged to be in a daytime lighting condition. Finally, at step S26, a daytime and nighttime image recognizing result is provided as an output based on the recognizing result determined at step S25.

However, in the second method, it is necessary to find the lane lines of the lane in which the object vehicle is traveling and obtain the distribution of the lightness value of the air region in the image based on the lane lines. Thus, in the case that there is no lane line on a road or the image includes no lane line, the method cannot determine the air region for calculating the distribution of the lightness value. Accordingly, the method is unable to proceed to the subsequent steps, so that no daytime and nighttime image recognition will be achieved.

Additionally, as shown in FIG. 7, under a natural condition, the regions above a vanishing point in the image will still be affected by the buildings and mountains in the background. In the daytime, when the background is entirely obstructed by remote buildings or mountains, the lightness around the object vehicle is still under a daytime lighting condition, because it actually is not affected by the remote background. Meanwhile, if the second method divides the region above the vanishing point into 16 small regions, more than ¾ of the small regions still will be determined to be nighttime regions. This will certainly cause an incorrect determination so that an algorithm unsuitable to the current environment will be used, and a case that a vehicle image is unable to be recognized or is incorrectly recognized will occur.

Because of the complexity of the environment through which the vehicle travels, it is difficult to guarantee in some special cases that each image will be recognized correctly. For the above known methods, if an incorrect recognition occurs in one image, it is difficult to recognize and partition a vehicle image from the incorrectly recognized image, and the error is introduced in subsequent processing such as vehicle image tracking.

BRIEF SUMMARY

The present invention is proposed in view of the above problem, and an object of the present invention is to provide a daytime and nighttime image recognizing method and apparatus that is able to correctly recognize a lighting condition of the environment even if the air region in an image is obstructed by a background, or there is no lane line in an image. Moreover, when erroneous recognitions occur in individual images, the interference caused by the erroneous recognitions can be precluded efficiently.

To achieve the object of the present invention, a daytime and nighttime image recognizing method according to one embodiment of the present invention comprises:

predefining an air region and a terrestrial region for an image captured by a camera apparatus;

inputting an image captured by the camera apparatus;

calculating a lightness value histogram for the air region of the input image; and determining a lighting condition of a photo environment of the camera apparatus based on the lightness value histogram for the air region of the input image.

To achieve the object of the present invention, a daytime and nighttime image recognizing apparatus according to one embodiment of the invention comprises:

a region setting unit, for predefining an air region and a terrestrial region for an image captured by a camera apparatus;

an inputting unit, for inputting an image captured by the camera apparatus;

a calculating unit, for calculating a lightness value histogram for the air region of the input image; and a single frame determining unit, for determining a lighting value condition of a photo environment of the camera apparatus based on the lightness value histogram for the air region of the input image.

DETAILED DESCRIPTION OF THE DRAWINGS AND THE PRESENTLY PREFERRED EMBODIMENTS

A daytime and nighttime image recognizing method and apparatus of one embodiment of the present invention will be described in detail hereinafter in conjunction with the accompanying drawings.

Figure 1:
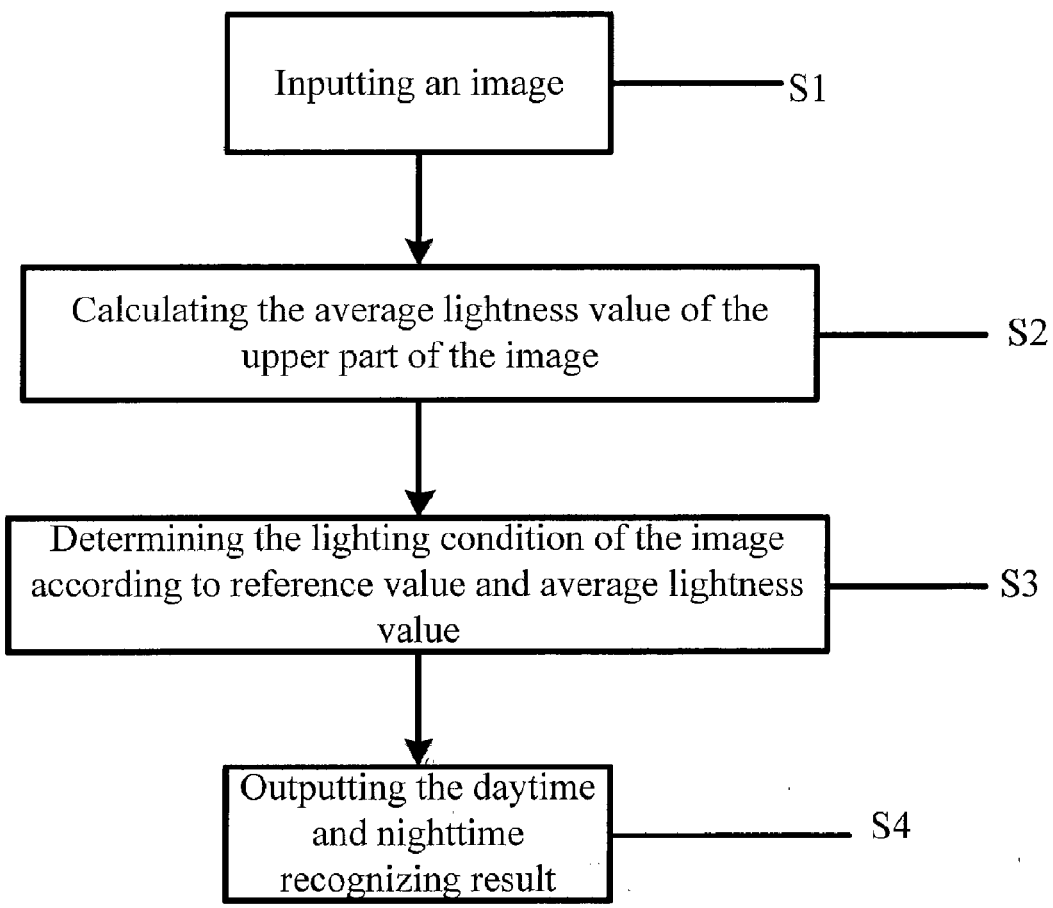
FIG. 1 illustrates a flow chart of an existing first daytime and nighttime image recognizing method.
Figure 2:
FIG. 2 illustrates an image with bridges in its background.
Figure 3:
FIG. 3 illustrates an image with mountains in its background.
Figure 4:
FIG. 4 illustrates an image with buildings in its background.
Figure 5:
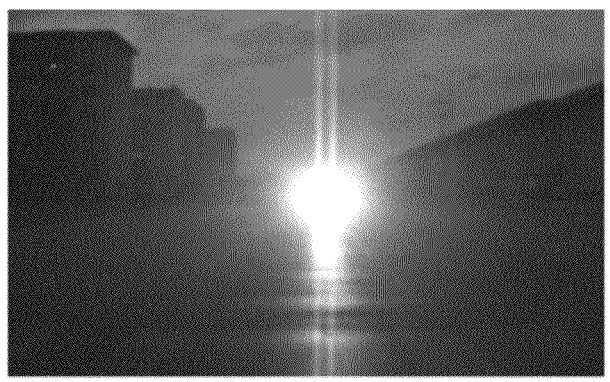
FIG. 5 illustrates an image with headlights of other near vehicles in its background.
Figure 6:
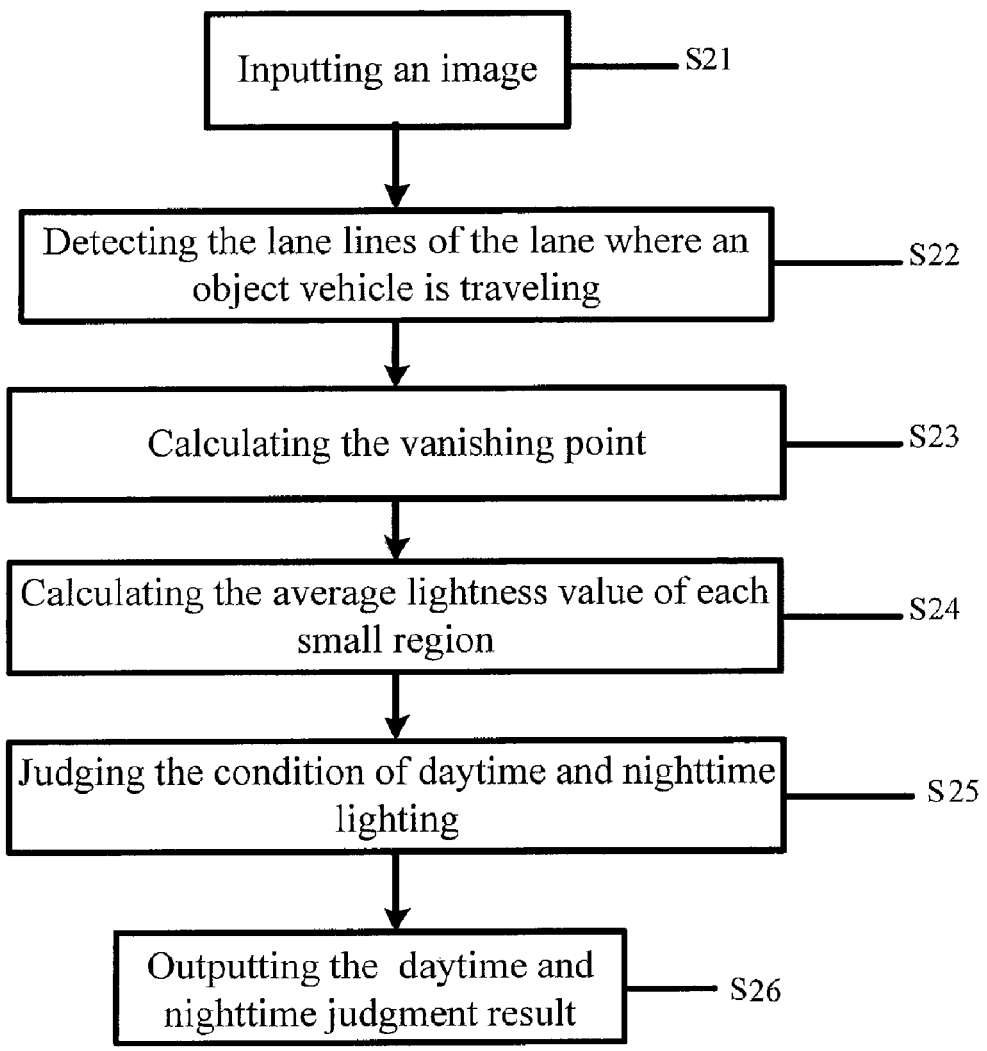
FIG. 6 illustrates a flow chart of an existing second daytime and nighttime image recognizing method.
Figure 7:
FIG. 7 illustrates an image including mountains in its background without affecting the lighting around a vehicle.
Figure 8:
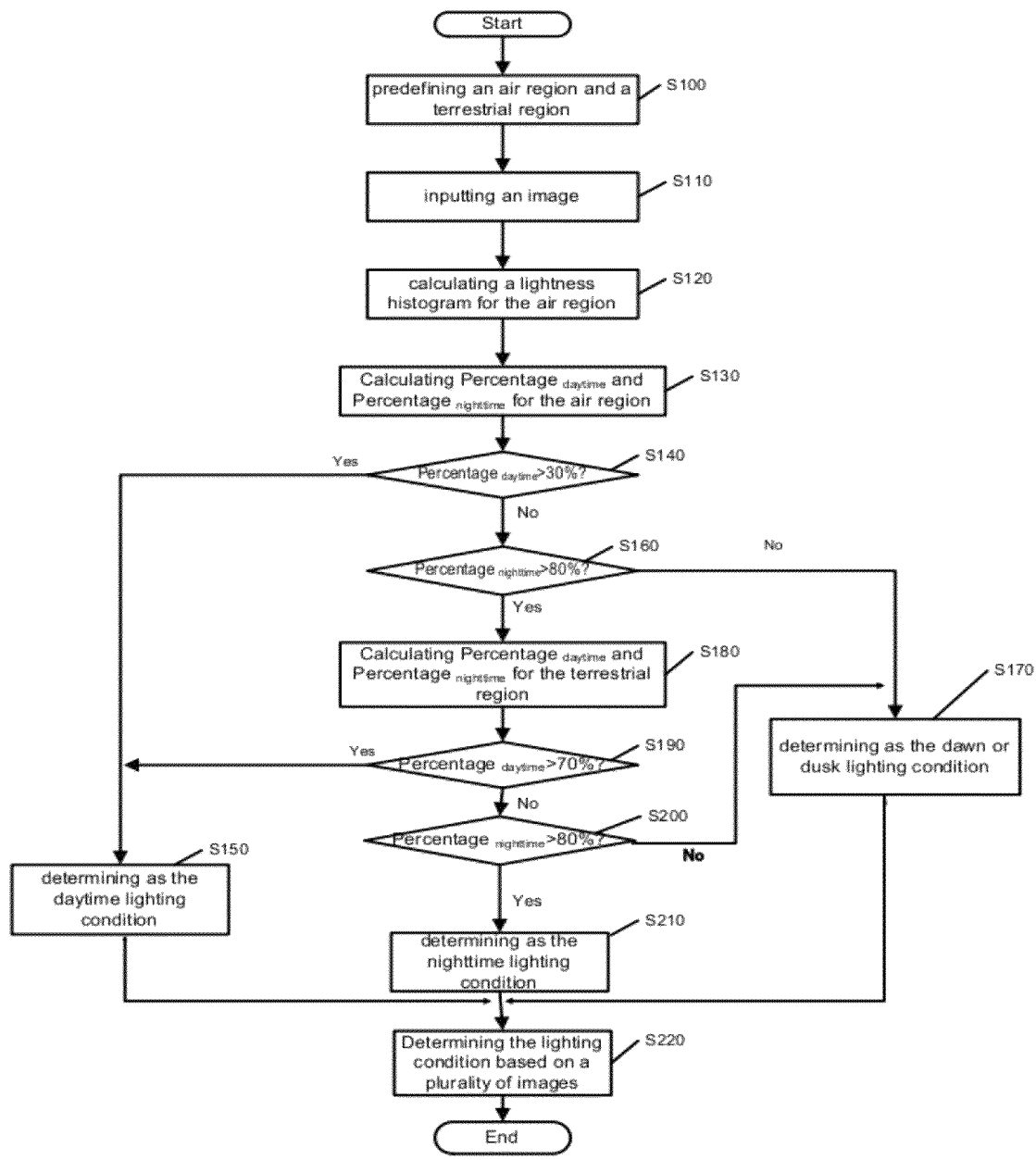
FIG. 8 illustrates a flow chart of a daytime and nighttime image recognizing method according to an embodiment of the present invention.

FIG. 8 is a flowchart of a daytime and nighttime image recognizing method according to an embodiment of the present invention. First, in step S100, in view of factors such as a height at which a camera apparatus such a TV camera or a monitoring camera is placed on an object vehicle, the shooting angle of the camera apparatus, etc, an air region and an terrestrial region of each frame of an image captured by the camera apparatus are predetermined.

In step S110, a frame of image f containing vehicles that travel on a road captured by the camera apparatus is input.

Next, in step S120, a lightness histogram hf(n) of the air region of the image f is calculated, wherein n represents a lightness level (also referred to as lightness value). In the digital image processing field, the lightness histogram of an image, which describes the number of pixels for each lightness value, is a function commonly known to those skilled in this art. The lightness histogram of an image is generally represented by two-dimensional coordinates with its abscissa representing the lightness value and its ordinate representing the number of pixels for each lightness value.

After obtaining a lightness histogram hf(n) of the air region of the image f, because there may be local maximal values or minimal values in the histogram, a local smoothing on the lightness histogram hf(n) could be done to remove the local maximal values or minimal values. In this embodiment, the following formula can be used to perform smoothing:

$$h_f(z) = 1/2k+1 \sum_{i=-k}^{k} h_f(z+i) \quad (1)$$

In formula (1), z represents the lightness value to be smoothed; k is a constant that represents the range of lightness values used by the smoothing and is set based on the different conditions.

In step S130, the following formulas (2) and (3) are used to respectively calculate the percentage $Percentage_{daytime}$ of pixels for highlight zones (with a lightness value greater than or equal to T1) and the percentage $Percentage_{nighttime}$ of pixels for lowlight zones (with a lightness value less than or equal to T2) in the air region.

$$Percentage_{daytime} = h_f(f(x,y))/h_f(f(x,y))T1 \leq f(x,y) \leq 255 \quad (2)$$

$$Percentage_{nighttime} = h_f(f(x,y))/h_f(f(x,y))0 \leq (x,y) \leq T2 \quad (3)$$

In formulas 2 and 3, f'(x,y) and f(x,y) represent lightness values for pixels with coordinates x and y, T1 represents the lower limit lightness value of the highlight zones, T2 represents the upper limit lightness value of the lowlight zones, T1 is larger than T2, and T1, T2 can be set according to the actual requirements.

In step S140, it is judged whether $Percentage_{daytime}$ of the air region is larger than 30%. In step S150, when it is judged that $Percentage_{daytime}$ of the air region is larger than 30%, it is determined that the environment (i.e., the environment picked up by the camera apparatus) in which the object vehicle travels in the image f is a daytime lighting condition.

Figure 9:
FIG. 9 illustrates an image with the air region being partly obstructed.
Figure 10:
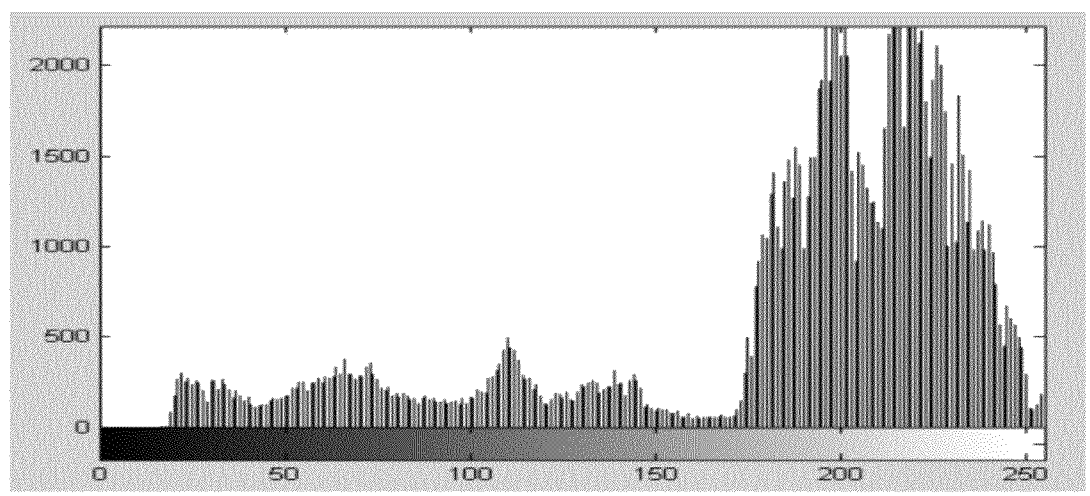
FIG. 10 illustrates a lightness histogram of the air region of the image shown in FIG. 9.

In the daytime, when the air region of the image is not obstructed, the lightness values of the air region will mainly be distributed over the highlight zones. However, as shown in FIG. 9, when the air region is partly obstructed, the lightness values of the parts being obstructed may be distributed over lowlight or middlelight regions, but the lightness values of the parts not being obstructed will still be distributed over the highlight regions. Here, the distribution of the histogram will reflect a two-peak feature, i.e., the highlight zones and the middlelight zones have respective concentrated distributed peaks, as shown in FIG. 10. In the nighttime, the street lamps in the air region have very high lightness values which occupy only a small area in the entire air region, and the lightness of the entire air region is mostly in the lowlight zones. Thus, in this embodiment, when the Percentage$_{daytime}$ is larger than 30%, it is determined that the environment in which the object vehicle travels in the image f is the daytime lighting condition.

In step S160, after it is judged that the Percentage$_{daytime}$ of the air region is not greater than 30%, it is further judged whether the Percentage$_{nighttime}$ of the air region is greater than 80%. In step S170, after it is judged that the Percentage$_{nighttime}$ of an air region is not greater than 80%, it is determined that the environment in which the object vehicle travels in the image f is the dawn or dusk lighting condition.

Figure 11:
FIG. 11 illustrates an image with a dawn or dusk lighting condition.
Figure 12:
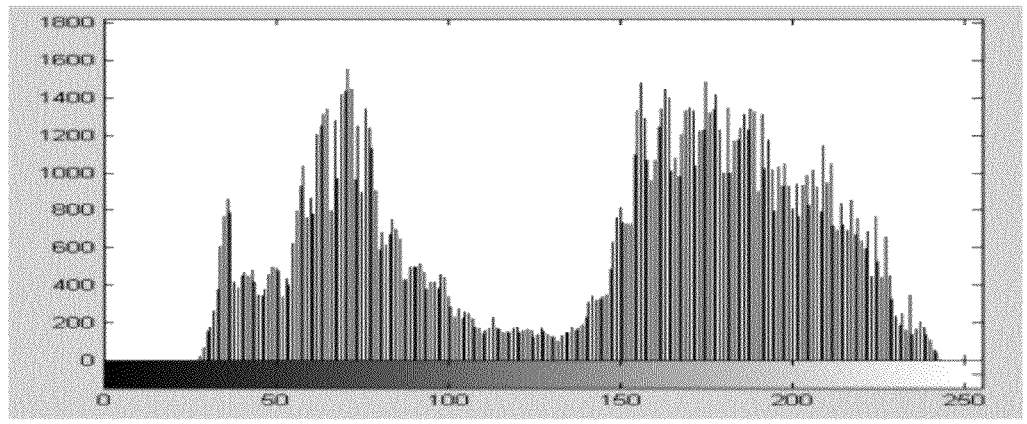
FIG. 12 illustrates a lightness histogram of the air region of the image shown in FIG. 11.

Because the air lightness of the dawn and dusk shown in FIG. 11 is between those of the daytime and the nighttime, the lightness histogram of the air region presents a characteristic that most of the lightness values focus on the middlelight zones, and few or no lightness values are distributed over the highlight zones or the lowlight zones, as shown in FIG. 12. Therefore, in this embodiment, when the Percentage$_{daytime}$ of the air region is less than 30% and the Percentage$_{nighttime}$ is not greater than 80%, it is determined that the environment in which the object vehicle travels in the image f is the dawn or dusk lighting condition.

In step S180, when it is judged that the Percentage$_{nighttime}$ of the air region is larger than 80%, Percentage$_{daytime}$ and Percentage$_{nighttime}$ of the terrestrial region of the image f are calculated according to formulas (2) and (3) respectively.

In step S190, it is judged whether the Percentage$_{daytime}$ of the terrestrial region is greater than 70%. In step S150, after it is judged that the Percentage$_{daytime}$ of the terrestrial region is greater than 70%, it is determined that the environment in which the object vehicle travels in the image f is the daytime lighting condition.

Figure 13:
FIG. 13 illustrates an image including mountains in its background without affecting the lighting around a vehicle.
Figure 14:
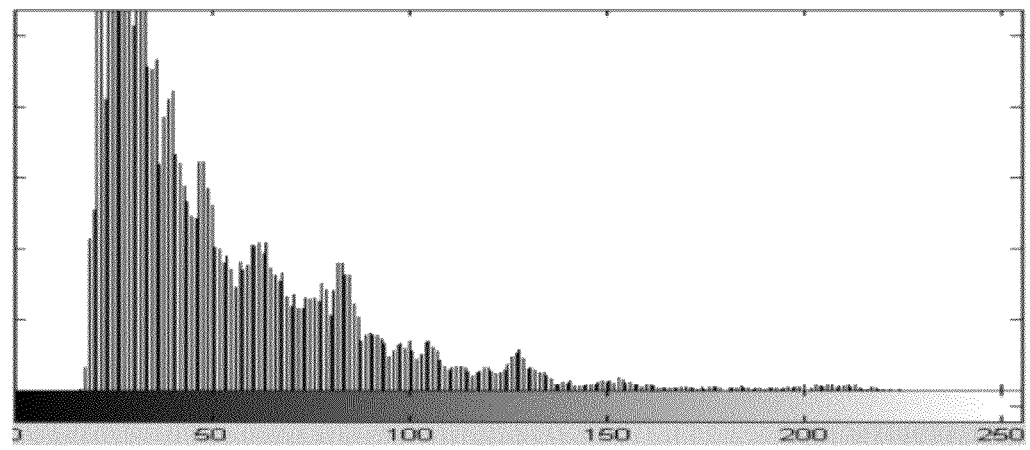
FIG. 14 illustrates a lightness histogram of the air region of the image shown in FIG. 13.
Figure 15:
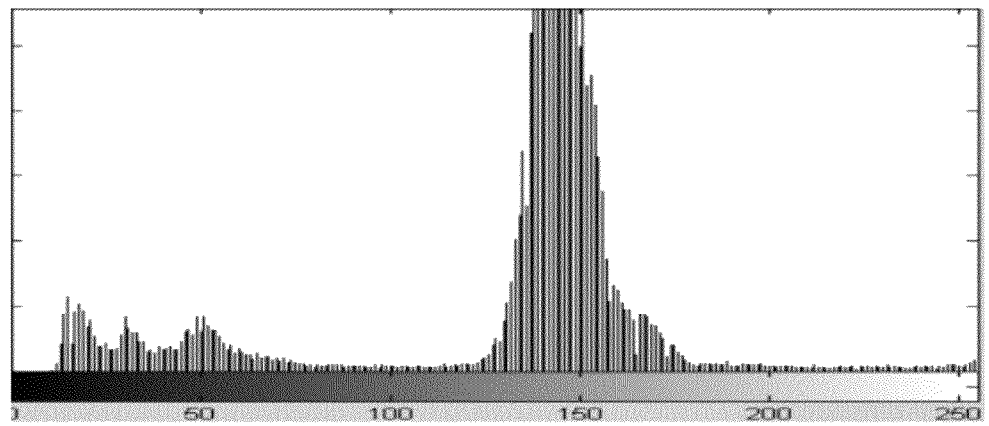
FIG. 15 illustrates a lightness histogram of the terrestrial region of the image shown in FIG. 13.

As shown in FIG. 13, in the daytime, when the air region of the image is completely obstructed by a background including remote buildings, mountains and the like, the lighting around the object vehicle (i.e., the terrestrial region of the image) is not affected by the remote background but remains in the daytime lighting condition. An erroneous determination will be made if the lighting condition of the environment in which the object vehicle travels in the image f is determined only by the lightness distribution of the air region. Therefore, in this embodiment, as shown in FIG. 14, when the lightness distribution of the air region of the image f indicates that the lightness values are distributed mostly over the lowlight zones, the lightness distribution of the terrestrial region of the image f is used to make a further decision. As shown in FIG. 15, when the lightness distribution of the terrestrial region indicates that the lightness values are distributed mostly over the highlight zones (i.e., Percentage$_{daytime}$ is greater than 70%), it is determined that the environment in which the object vehicle travels in the image f is the daytime lighting condition.

In step S200, after it is judged that Percentage$_{daytime}$ of the terrestrial region is not greater than 70%, it is further judged whether the Percentage$_{nighttime}$ of the terrestrial region is greater than 80%.

In step S210, after it is judged that the Percentage$_{nighttime}$ of the terrestrial region is greater than 80%, it is determined that the environment in which the object vehicle travels in the image f is the nighttime lighting condition.

Figure 16:
FIG. 16 illustrates an image with a nighttime lighting condition.
Figure 17:
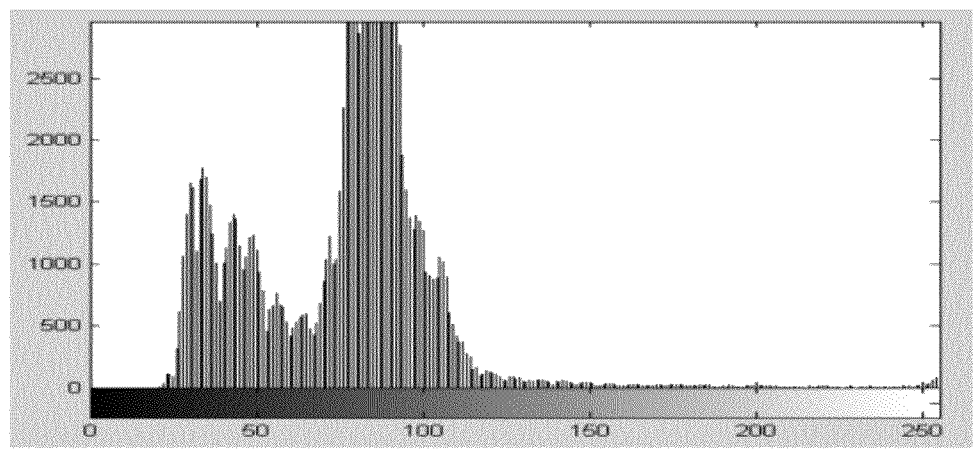
FIG. 17 illustrates a lightness histogram of the air region and the terrestrial region of the image shown in FIG. 16.

As shown in FIG. 16, in the nighttime, both the air region and the terrestrial region of the image f are very dark, and the lightness values of both regions are distributed mostly over the lowlight zones in the histogram shown in FIG. 17. In this case, even though the headlights of vehicles or street lamps present in the air region will increase the lightness values of the areas where vehicle headlights or background lamps are located in the image, the distribution of the histogram still indicates that lightness values are distributed mostly over the lowlight zones, because the image area of the vehicle headlights and street lamps is very small compared with that of the air region. In this case, it is determined that the environment in which the object vehicle travels in the image f is the nighttime lighting condition.

In step S220, steps S100-S210 are performed on each of a plurality of images, to obtain a plurality of lighting conditions, and it is determined that the lighting condition which appears most frequently is the lighting condition of the environment in which the object vehicle travels. Because the time period that interference occurs due to moving vehicles, background buildings, bridges and nearby vehicle headlights is very short compared with the time period of the daytime or the nighttime, it is possible to remove the effect caused by those interferences to the daytime and nighttime image decision by considering a plurality of images.

It should be understood by those skilled in this art that the specific percentages (30%, 70% and 80%) presented in this embodiment are only intended to illustrate but not to limit the invention. It also should be understood by those skilled in the art that although the above embodiment uses a camera apparatus mounted on a vehicle as an example to illustrate the present invention, the present invention is not limited to that. In the present invention, the camera apparatus can be mounted on a stationary object such as a monitoring station or a crossover on the road to capture an image.

Figure 18:
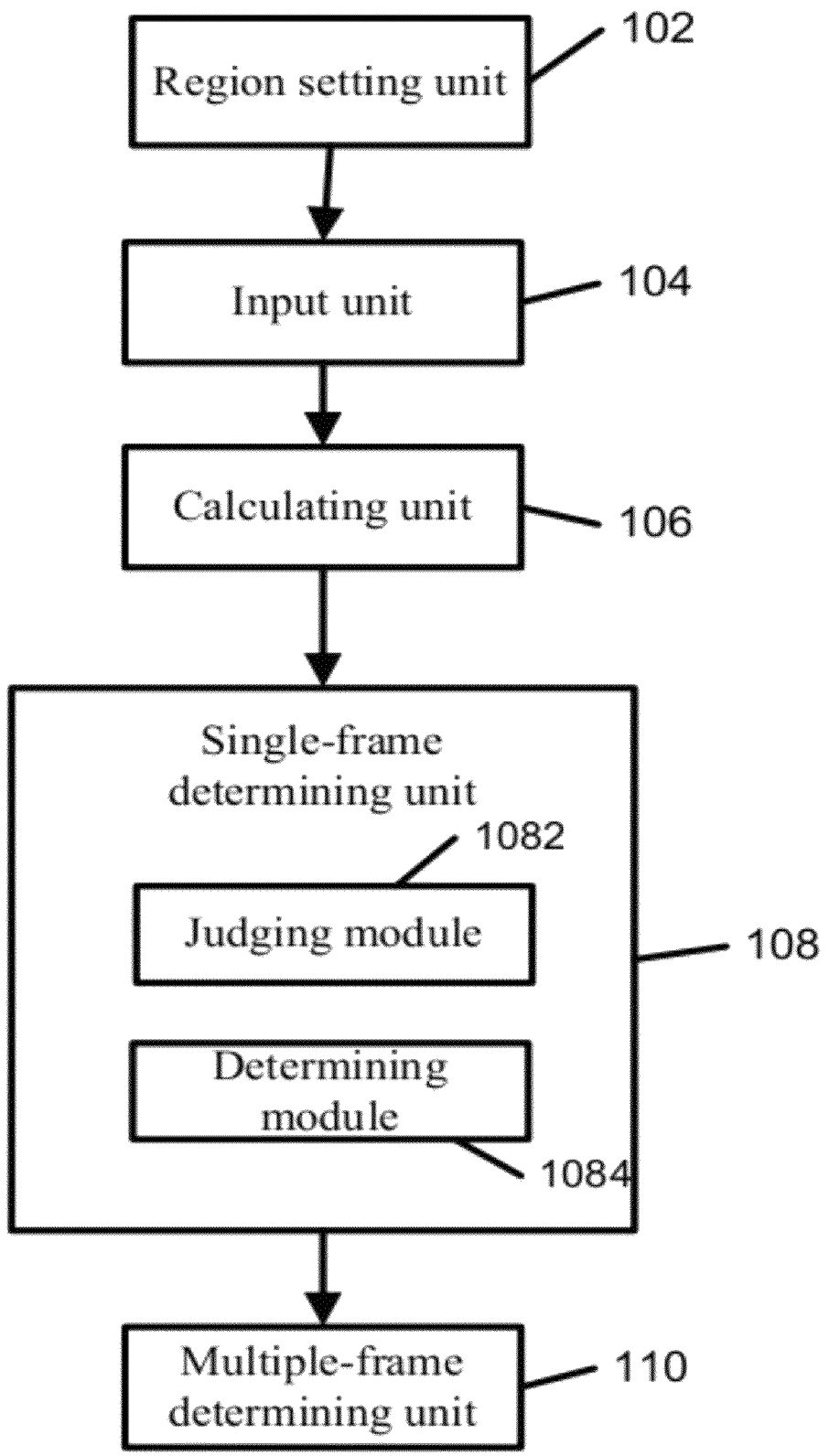
FIG. 18 illustrates a daytime and nighttime image recognizing apparatus according to an embodiment of the invention.

FIG. 18 illustrates a daytime and nighttime image recognizing apparatus according to an embodiment of the present invention. As shown in FIG. 18, a daytime and nighttime image recognizing apparatus 100 comprises a region setting unit 102, an input unit 104, a calculating unit 106, a single-frame determining unit 108 and a multi-frame determining unit 110.

The region setting unit 102 predefines an air region and a terrestrial region for each image captured by a camera apparatus mounted on a vehicle or on a stationary object such as a monitoring station or a crossover on the road. The input unit 104 inputs an image captured by the camera apparatus. The calculating unit 106 calculates a lightness value histogram for the air region of the input image. The single-frame determining unit 108 determines the lighting condition for the photo condition of the camera apparatus based on the calculated lightness value histogram for the air region of the input image.

The single-frame determining unit 108 further comprises a judging module 1082 and a determining module 1084. The judging module 1082 judges whether a ratio of the number of pixels with their lightness values larger than a first lightness value (T1) in the air region of the input image to the number of all pixels of the air region in the input image is greater than a first ratio such as 30%. When the judgment result is Yes, the determining module 1084 determines the photo environment of the camera apparatus as the daytime lighting condition.

When the judgment result is No, the judging module 1082 further judges whether the ratio of the number of pixels with their lightness values less than a second lightness value (T2) which is smaller than the first lightness value (T1) in the air region of the input image to the number of all pixels of the air region in the input image is greater than a second ratio such as 80%, based on distribution information of the lightness value histogram for the air region of the input image. When the further judgment result is No, the determining module 1084 determines the photo environment of the camera apparatus as the dawn or dusk lighting condition.

When the further judgment result is Yes, the calculating unit 106 calculates a lightness value histogram for the terrestrial region of the input image. The judging module 1082 yet further judges whether a ratio of the number of pixels with their lightness values larger than the first lightness value (T1) in the terrestrial region of the input image to the number of all pixels of the terrestrial region in the input image is greater than a third ratio such as 70%, based on the lightness value histogram for the terrestrial region of the input image. When the yet further judgment result is Yes, the determining module 1084 determines the photo environment of the camera apparatus as the daytime lighting condition.

When the yet further judgment result is No, the judging module 1082 further judges whether a ratio of the number of pixels with their lightness values less than the second lightness value (T2) in the terrestrial region of the input image to the number of all pixels of the terrestrial region in the input image is greater than a fourth ratio such as 80%, based on the lightness value histogram for the terrestrial region of the input image. When the further judgment result is Yes, the determining module 1084 determines the photo environment of the camera apparatus as the nighttime lighting condition.

The multi-frame determining unit 110 determines the lighting condition for the photo environment of the camera apparatus based on the determined lighting conditions of a plurality of images captured by the camera apparatus.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A daytime and nighttime image recognizing method, comprising:
    inputting an image captured by a camera apparatus;
    predefining an air region and a terrestrial region for the input image captured by the camera apparatus;
    calculating a lightness value histogram for the air region of the input image;
    determining a lighting condition of a photo environment of the camera apparatus based on the lightness value histogram for the air region of the input image, wherein determining the lighting condition further includes:
        judging whether a ratio of a number of pixels with lightness values larger than a first lightness value (T1) in the air region of the input image to the total number of pixels in the air region of the input image is greater than a first ratio; and
        determining the photo environment of the camera apparatus as a daytime lighting condition if the judgment result is affirmative; and
    wherein calculating the lightness value histogram and determining the lighting condition require no vehicle lane lines in the input image.

2. The method according to claim 1, wherein the first ratio is approximately 30%.

3. The method according to claim 1, further comprising:
    if the judgment result is negative, further judging whether a ratio of a number of pixels with lightness values less than a second lightness value (T2) which is smaller than the first lightness value (T1) in the air region of the input image to the number of all pixels of the air region in the input image is greater than a second ratio, based on distribution information of the lightness value histogram for the air region of the input image; and
    determining the photo environment of the camera apparatus as one of a dawn or dusk lighting condition, if the further judgment result is negative.

4. The method according to claim 3, wherein the second ratio is approximately 80%.

5. The method according to claim 3, further comprising:
    calculating a lightness value histogram for the terrestrial region of the input image if the further judgment result is affirmative;
    yet further judging whether a ratio of a number of pixels with lightness values larger than the first lightness value (T1) in the terrestrial region of the input image to the number of all pixels of the terrestrial region in the input image is greater than a third ratio, based on the lightness value histogram for the terrestrial region of the input image; and
    determining the photo environment of the camera apparatus as the daytime lighting condition if the yet further judgment result is affirmative.

6. The method according to claim 5, wherein the third ratio is approximately 70%.

7. The method according to claim 5, further comprising:
    additionally judging whether a ratio of a number of pixels with lightness values less than the second lightness value (T2) in the terrestrial region of the input image to the number of all pixels of the terrestrial region in the input image is greater than a fourth ratio, based on the lightness value histogram for the terrestrial region of the input image, if the yet further judgment result is negative; and
    determining the photo environment of the camera apparatus as the nighttime lighting condition, if the result of the additional judging is affirmative.

8. The method according to claim 7, wherein the fourth ratio is approximately 80%.

9. The method according to claim 1, further comprising:
    determining the lighting condition for the photo environment of the camera apparatus based on determined lighting conditions of a plurality of images captured by the camera apparatus.

10. The method according to claim 1, wherein the camera apparatus is mounted on one of a vehicle or a stationary object.

11. A daytime and nighttime image recognizing method, comprising:
    inputting an image captured by a camera apparatus;
    predefining an air region and a terrestrial region for the input image captured by the camera apparatus;
    calculating a lightness value histogram for the air region of the input image;
    determining a lighting condition of a photo environment of the camera apparatus based on the lightness value histogram for the air region of the input image;
    wherein determining the lighting condition further comprises:
        judging whether a ratio of a number of pixels with lightness values larger than a first lightness value (T1) in the air region of the input image to the total number of pixels in the air region of the input image is greater than a first ratio; and determining the photo environment of the camera apparatus as a daytime lighting condition if the judgment result is affirmative.

12. The method according to claim 11, wherein the first ratio is approximately 30%.

13. The method according to claim 11, further comprising:
if the judgment result is negative, further judging whether a ratio of a number of pixels with lightness values less than a second lightness value (T2) which is smaller than the first lightness value (T1) in the air region of the input image to the number of all pixels of the air region in the input image is greater than a second ratio, based on distribution information of the lightness value histogram for the air region of the input image; and when the further judgment result is no, determining the photo environment of the camera apparatus as one of a dawn or dusk lighting condition.

14. The method according to claim 13, wherein, the second ratio is approximately 80%.

15. The method according to claim 13, further comprising:
if the result of the further decision is affirmative, calculating a lightness value histogram for the terrestrial region of the input image;

yet further judging whether a ratio of a number of pixels with lightness values larger than the first lightness value (T1) in the terrestrial region of the input image to the number of all pixels of the terrestrial region in the input image is greater than a third ratio, based on the lightness value histogram for the terrestrial region of the input image; and when the yet further judgment result is affirmative, determining the photo environment of the camera apparatus as the daytime lighting condition.

16. The method according to claim 15, wherein, the third ratio is approximately 70%.

17. The method according to claim 15, further comprising:
if the yet further judgment result is negative, more further judging whether a ratio of a number of pixels with lightness values less than the second lightness value (T2) in the terrestrial region of the input image to the number of all pixels of the terrestrial region in the input image is greater than a fourth ratio, based on the lightness value histogram for the terrestrial region of the input image; and when the more further judgment result is affirmative, determining the photo environment of the camera apparatus as a nighttime lighting condition.

18. The method according to claim 17, wherein, the fourth ratio is approximately 80%.

19. The method according to claim 11, further comprising:
obtaining data to determine the lighting condition for the photo environment based on determined lighting conditions of a plurality of images captured.

20. The method according to claim 11, wherein the camera apparatus is mounted on one of a vehicle or a stationary object.

* * * * *